United States Patent
Déjean et al.

(10) Patent No.: US 10,803,233 B2
(45) Date of Patent: Oct. 13, 2020

(54) METHOD AND SYSTEM OF EXTRACTING STRUCTURED DATA FROM A DOCUMENT

(71) Applicant: Conduent Business Services, LLC, Dallas, TX (US)

(72) Inventors: Hervé Déjean, Grenoble (FR); Darren S. Schroeder, Hot Springs, AR (US)

(73) Assignee: Conduent Business Services LLC, Florham Park, NJ (US)

( * ) Notice: Subject to any disclaimer, the term of this patent is extended or adjusted under 35 U.S.C. 154(b) by 201 days.

(21) Appl. No.: 14/107,333

(22) Filed: Dec. 16, 2013

(65) Prior Publication Data

US 2015/0169510 A1 Jun. 18, 2015

(51) Int. Cl.
| G06F 40/14 | (2020.01) |
| G06K 9/00 | (2006.01) |
| G06F 40/197 | (2020.01) |

(52) U.S. Cl.
CPC ............ *G06F 40/14* (2020.01); *G06F 40/197* (2020.01); *G06K 9/00442* (2013.01); *G06K 9/00449* (2013.01); *G06K 9/00463* (2013.01)

(58) Field of Classification Search
CPC ...... G06F 17/24; G06F 17/25; G06F 17/2247; G06F 17/2288; G06F 40/14; G06F 40/197; G06T 11/60; A63F 2300/5553; A63F 2300/6623; G06K 9/00442; G06K 9/00449; G06K 9/00463
USPC .................. 715/201, 202, 230, 255; 719/229
See application file for complete search history.

(56) References Cited

U.S. PATENT DOCUMENTS

| 7,440,974 | B2 | 10/2008 | Chidlovskii | |
| 7,590,647 | B2 * | 9/2009 | Srinivasan | ............ G06F 17/245 |
| 7,937,653 | B2 | 5/2011 | Déjean et al. | |
| 8,090,724 | B1 | 1/2012 | Welch et al. | |
| 8,885,951 | B1 * | 11/2014 | Cristofano | ......... G06K 9/00449 |
| | | | | 382/173 |
| 2005/0022115 | A1 * | 1/2005 | Baumgartner | ...... G06F 16/9535 |
| | | | | 715/205 |
| 2005/0094206 | A1 * | 5/2005 | Tonisson | ............... G06F 17/248 |
| | | | | 358/1.18 |
| 2005/0177586 | A1 * | 8/2005 | Chen | .................... G06F 16/9577 |
| 2005/0256841 | A1 * | 11/2005 | Rawat | .................... G06F 17/243 |
| 2008/0148144 | A1 * | 6/2008 | Tatsumi | ................ G06F 17/218 |
| | | | | 715/235 |
| 2011/0145701 | A1 | 6/2011 | Déjean et al. | |

(Continued)

FOREIGN PATENT DOCUMENTS

EP 1 826 684 A1 8/2007

OTHER PUBLICATIONS

U.S. Appl. No. 13/530,141, filed Jun. 22, 2012, Hervé Déjean.

(Continued)

*Primary Examiner* — Kavita Padmanabhan
*Assistant Examiner* — Jenq-Kang Chu
(74) *Attorney, Agent, or Firm* — Fay Sharpe LLP

(57) ABSTRACT

This disclosure provides an exemplary method and system for extracting structured data from an unstructured textual document. According to an exemplary method, initially a layout analysis is performed resulting in one or more alternatives for grouping and ordering the page elements of interest. Next, the content of these page elements are tagged based on application-specific heuristics. Finally, a sequence-based method is applied to the tags for identifying repetitive contiguous patterns.

16 Claims, 10 Drawing Sheets

(56) References Cited

U.S. PATENT DOCUMENTS

2012/0079370 A1 3/2012 Déjean
2012/0201457 A1 8/2012 Bart et al.
2012/0317470 A1 12/2012 Déjean
2013/0114914 A1 5/2013 Déjean
2013/0321867 A1 12/2013 Déjean

OTHER PUBLICATIONS

U.S. Appl. No. 13/911,452, filed Jun. 6, 2013, Hervé Déjean.
Nagy et al., "A Prototype Document Image Analysis System for Technical Journals", CSE Journal Article, Department of Computer Science and Engineering, pp. 10-22, Jul. 1992.
Wong et al., "Document analysis system", IBM Journal of Research and Development, vol. 26, No. 6, pp. 647-656, Nov. 1982.
Galle, "Compact Hierarchical Structures in DNA by Means of the Smallest Grammar Problem", Feb. 15, 2011, 143 pages, Universite de Rennes 1.
European Search Report for Application No. 14195976.7-1901, 10 pages, The Hague, Search Completion Apr. 30, 2015.
Tang et al., "Automatic Document Processing: A Survey", Received for publication Apr. 4, 1996; p. 1931-1951.
Brugger et al., "Modeling Documents for Structure Recognition Using Generalized N-Grams", 1997 IEEE, pp. 56-60.
Mao et al., "Document Structure Analysis Algorithms: A Literature Survey", Proc. of SPIE vol. 5010, 2003, pp. 197-207.

\* cited by examiner

PROJECT DIRECTORY

102 — DEVELOPER
▓▓▓ DEVELOPMENT GROUP, INC.
▓▓▓ McCORMICK DRIVE
CLEARWATER, FL 33579
(727) ▓▓▓
CONTACT: ▓▓▓

104 — CIVIL ENGINEER
▓▓▓ GROUP, INC.
050 ▓▓▓ MANOR DRIVE
SUITE ▓▓▓
TAMPA, FL 33610
(83) ▓▓▓
CONTACT: ▓▓▓

106 — ARCHITECT
▓▓▓ ARCHITECTURE STUDIO, INC
▓▓▓ DR MARTIN LUTHER KING JR ST. N.
ST. PETERSBURG, FL 33705 ▓▓▓
CONTACT: ▓▓▓ AIA

108 — LANDSCAPE ARCHITECT
▓▓▓ LIMITED, INC.
▓▓▓ S. WESTSHORE BLVD.
TAMPA, FL 33611
(813) ▓▓▓
CONTACT: ▓▓▓

110 — SURVEYOR
▓▓▓ ASSOCIATES, INC
265 ▓▓▓ BLVD.
CLEARWATER, FL 33765
▓▓▓ 461-613
CONTACT: ▓▓▓

112 — GEOTECHNICAL ENGINEER
▓▓▓ ASSOCIATES, INC.
▓▓▓ S. ORANGE AVE.
ORLANDO, FL 32809
(407) ▓▓▓
CONTACT: ▓▓▓

114 — ENVIRONMENTAL CONSULTANT
▓▓▓ INC.
▓▓▓ FLETCHER AVE.
TAMPA, FL 33637
3 7 900
CONTACT: ▓▓▓

PROJECT DIRECTORY CONT.

116 — LIGHTING DESIGNER
▓▓▓ LIGHTING
70 ▓▓▓ BLVD.
GREENVILLE, SC 29607 ▓▓▓
CONTACT: ▓▓▓

118 — CITY OF SOUTH DAYTONA
COMMUNITY DEVELOPMENT DEPARTMENT
672 ▓▓▓
SOUTH DAYTONA, FL 329
(386) ▓▓▓
CONTACT: ▓▓▓

120 — ST. JOHNS RIVER WATER MANAGEMENT DISTRICT
▓▓▓ KELLER ROAD
ALTAMONTE SPRINGS, FL 3274 ▓▓▓
CONTACT: ▓▓▓

122 — FLORIDA DEPARTMENT OF ENVIRONMENTAL PROTECTION
POTABLE WATER PERMITTING:
NORTHWEST DISTRICT OFFICE
60 GOVERNMENTAL CENTER, STE. 308
PENSACOLA, FL 32502-5794
▓▓▓ EXT. 1141
CONTACT: MS ▓▓▓

124 — FLORIDA DEPARTMENT OF TRANSPORTATION DISTRICT 5
79 S. WOODLAND BLVD.
DELAND, FL 32720 ▓▓▓
CONTACT:

126 — WATER & WASTE WATER PROVIDER
CITY OF SOUTH DAYTONA PUBLICWORKS DEPARTMENT
770 SEGRAVE STREET
SOUTH DAYTONA, FL 32119
(386) ▓▓▓
CONTACT: ▓▓▓

128 — POWER PROVIDER
▓▓▓ POWER AND LIGHT COMPANY
(386) ▓▓▓
CONTACT: ▓▓▓

130 — TELECOMMUNICATIONS PROVIDER
▓▓▓ NETWORKS
475 S NOVA AD
DAYTONA BEA FL 324
(386) ▓▓▓
CONTACT: ▓▓▓

FIG. 1

OWNER & CONSULTANTS

202 — LANDLORD

204 —
```
NAME:
    BUILDING ASSOCIATES, LLC
ADDRESS:
    K ON OH        3
CONTACT
```

206 —
```
PHONE: (330)
PARCEL:
```

208 — TENANT

210 —
```
O      R
    C E DRIVE
SALISBURY, NC 28594
CONTACT:
EMAIL:
```

212 — ARCHITECT

214 —
```
    COURTLAND ST. SUITE
ORLANDO, FL 32804
CONTACT:
EMAIL:
```

216 — STRUCTURAL ENGINEER

218 —
```
        ENGINEERING INC.
3222 CORRINE DRIVE - SUITE
LR NDO, R 32 286L1787
        (407)
CONTACT:
EMAIL:
```

220 — ELECTRICAL ENGINEER

222 —
```
    COURTLAND ST. SUITE
ORLANDO, FL 3280 R (HAN)
FR K
```

224 — MECHANICAL ENGINEER

226 —
```
    COURTLAND ST. SUITE
ORLANDO 32804
CONTACT: FR
```

228 — PLUMBING ENGINEER

230 —
```
    COURTLAND ST. SUITE
ORLANDO 32804
CONTACT: FR
```

232 — CML ENGINEER

234 —
```
        LLC
604 COURTLAND ST. SUITE 100
ORLANDO, FL 32804
CONTACT BOB:
```

236 — SURVEY

238 —
```
    ENGINEERING, INC
6,      SUITE
WILMINGTON, DE 19804
CONTACT XXXX
PHONE: (302)
EMAIL:        ENGINEERING.COM
```

FIG. 2

PREPARED BY

302 — MECHANICAL / ELECTRICAL:

304 — ██████ ENGINEERING CONSULTANTS, INC.

306 — 
T.B.P.E. FIRM REGISTRATION NUMBER: ██████
██████████ COVE
SUITE ██████
AUSTIN, TEXAS 78759

AND

308 — ROOFING :

310 — ██████ ENGINEERING AND ENVIRONMENTAL CONSULTING, INC.

312 — 
██████ ██████ DRIVE, SUITE ██████, AUSTIN, TEXAS 78757
T.B.P.E. FIRM REGISTRATION NUMBER ██████
PHONE: ██████  FAX: ██████  TOLL FREE: ██████
WWW.██████.COM

██████ ENGINEERING PROJECT NUMBER ██████

FIG. 3

602 — OWNER
604 — | THE CITY OF TARRANT, ALABAMA, A MUNICIPAL CORPORATION |

606 — ARCHITECT
608 — | ███ ARCHITECTS PC<br>BIRMINGHAM, AL |

610 — ASSOCIATE ARCHITECT
612 — | ███ ARCHITECTS INC<br>BIRMINGHAM, AL |

614 — MECHANICAL & ELECTRICAL ENGINEER
616 — | ███ ENGINEERING, INC<br>HOOVER, AL |

FIG. 6

METHOD AND SYSTEM OF EXTRACTING STRUCTURED DATA FROM A DOCUMENT

CROSS REFERENCE TO RELATED PATENTS AND APPLICATIONS

U.S. patent application Ser. No. 13/484,708, filed May 31, 2012, Publication No. 2013/0321867, published Dec. 5, 2013, by Herve Déjean, entitled "TYPOGRAPHICAL BLOCK GENERATION";

U.S. patent application Ser. No. 13/530,141, filed Jun. 22, 2012, by Nerve Déjean, entitled "SYSTEM AND METHOD FOR IDENTIFYING REGULAR GEOMETRIC STRUCTURES IN DOCUMENT PAGES"; and U.S. patent application Ser. No. 13/911,452, filed Jun. 6, 2013, by Herve Déjean; entitled "METHODS AND SYSTEMS FOR GENERATION OF DOCUMENT STRUCTURES BASED ON SEQUENTIAL CONSTRAINTS", are incorporated herein by reference in their entirety.

BACKGROUND

The exemplary embodiments disclosed herein relate to document processing and find particular application in connection with a method and system for extracting structured data from a digital version of a document.

While the use of electronically created and recorded documents is prevalent, many such electronic documents are in a form that does not permit them to be used other than for viewing or printing. To provide greater accessibility to the content of such documents, it is desirable to understand their structure. However, when electronic documents are recovered by scanning a hardcopy representation or by recovering an electronic representation, e.g., PDF (Portable Document Format) or Postscript representation, a loss of document structure usually results because the representation of the document is either at a very low level, e.g., bitmap, or an intermediate level, e.g., a document formatted in a page description language or a portable document format.

Geometric or physical page layout analysis can be used to recognize the different elements of a page, often in terms of text regions and image regions. Methods are known for determining a document's logical structure, or the order in which objects are laid out on a document image, i.e., layout objects. Such methods exploit the geometric or typographical features of document image objects, sometimes using of the content of objects and a priori knowledge of page layout for a particular document class. Geometric page layout analysis (GPLA) algorithms have been developed to recognize different elements of a page, often in terms of text blocks and image blocks. Examples of such algorithms include the X-Y Cut algorithm, described by Nagy et al., "A PROTOTYPE DOCUMENT IMAGE ANALYSIS SYSTEM FOR TECHNICAL JOURNALS", CSE Journal Article, Department of Computer Science and Engineering, pages 10-22, July, 1992 and the Smearing algorithm, described by Wong et al., "Document analysis system", IBM Journal of Research and Development, volume 26, No. 6, pages 647-656, November, 1982. These GPLA algorithms receive as input a page image and perform a segmentation based on information, such as pixel information, gathered from the page. These approaches to element recognition are either top-down or bottom-up and mainly aim to delimit boxes of text or images in a page. These methods are useful for segmenting pages one dimensionally, into columns.

In addition, as disclosed in U.S. patent application Ser. No. 13/911,452, filed Jun. 6, 2013, by Hervé Déjean; entitled "METHODS AND SYSTEMS FOR GENERATION OF DOCUMENT STRUCTURES BASED ON SEQUENTIAL CONSTRAINTS", a method and system is provided that structures a sequentially-ordered set of elements, each being characterized by a set of features. N-grams, i.e., a sequence of n features, are computed from a set for n contiguous elements, and n-grams which are repetitive, e.g., Kleene cross, are selected. Elements matching the most frequent repetitive n-gram are grouped together under a new node, and a new sequence is created. The method is iteratively applied to this new sequence. The output is an ordered set of trees.

A common task in document analysis is extracting data from an unstructured document, sometimes referred to as indexing. The extracted data can correspond to a single piece of text, such as an invoice number, or to structured data including several fields, such as an invoice item having a description, price per unit, total amount, etc. For purposes of this disclosure, this structured data is referred to as sdata (structured data).

A primary issue in extracting structured data is the lack of correspondence between the sdata/data fields and the way their layout is performed, except for documents which mostly follow a layout template such as forms. In some documents, one homogeneous block can contain all the data fields. In another document, each field may be spread over table cells. No generic algorithm can systematically provide segmentation where found layout elements correspond to a single sdata. An analysis combining layout information and content information is then required to identify complete sdata.

Accordingly, there is a need in the art for methods and systems to extract structured data from unstructured representations of documents.

INCORPORATION BY REFERENCE

U.S. Pat. No. 7,440,974, issued Oct. 21, 2008, by Boris Chidlovskii, entitled "METHOD FOR AUTOMATIC WRAPPER REPAIR";

U.S. Patent Application Publication No. 2012/0201457, published Aug. 9, 2012, by Bart et al., entitled "FINDING REPEATED STRUCTURE FOR DATA EXTRACTION FROM DOCUMENT IMAGES"; and U.S. Pat. No. 7,590,647, issued Sep. 15, 2009, by Srinivasan et al., entitled "METHOD FOR EXTRACTING, INTERPRETING AND STANDARDIZING TABULAR DATA FROM UNSTRUCTURED DOCUMENTS", are incorporated herein by reference in their entirety.

BRIEF DESCRIPTION

In one embodiment of this disclosure, described is a computer implemented method of extracting structured data associated with a digital version of a document. The method disclosed includes: a) performing a layout analysis of the digital version of the document to generate one or more layout structures associated with the document, each layout structure including a plurality of structural elements vertically or horizontally aligned where each structural element is defined as a typographical box including one or more lines of textual elements associated with the digital version of the document; b) tagging one or more of the lines of textual elements with one of a plurality of content tags, a tagged line of textual elements including structured elements of information associated with one of a plurality of predefined sdata (structured data) heuristics associated with the plurality of content tags; c) generating a content layout-model (clayout model), the clayout model associating the one or more content tags with respective repetitive layout positions associated with one of the one or more layout structures; d) tagging one or more lines of textual elements which were not tagged in step b) with one of the plurality of content tags based on inferred repetitive locations of the plurality of content tags provided by the clayout model; and e) extracting the tagged lines of textual information as representative of the structured data associated with the digital version of the document.

In another embodiment of this disclosure, described is an image processing system comprising; a controller configured to receive a digital version of a document, the controller configured to execute instructions to perform a method of extracting structured data associated with a digital version of a document. The method performed by the controller includes: a) performing a layout analysis of the digital version of the document to generate one or more layout structures associated with the document, each layout structure including a plurality of structural elements vertically or horizontally aligned where each structural element is defined as a typographical box including one or more lines of textual elements associated with the digital version of the document; b) tagging one or more of the lines of textual elements with one of a plurality of content tags, a tagged line of textual elements including structured elements of information associated with one of a plurality of predefined sdata (structured data) heuristics associated with the plurality of content tags; c) generating a content-layout model (clayout model), the clayout model associating the one or more content tags with respective repetitive layout positions associated with one of the one or more layout structures; d) tagging one or more lines of textual elements which were not tagged in step b) with one of the plurality of content tags based on inferred repetitive locations of the plurality of content tags provided by the clayout model; and e) extracting the tagged lines of textual information as representative of the structured data associated with the digital version of the document.

In still another embodiment of this disclosure, described is a computer program product comprising a non-transitory recording medium storing instructions, which when executed on a computer cause the computer to perform a method of extracting structured data associated with a digital version of a document. The method performed by the computer includes: a) performing a layout analysis of the digital version of the document to generate one or more layout structures associated with the document, each layout structure including a plurality of structural elements vertically or horizontally aligned where each structural element is defined as a typographical box including one or more lines of textual elements associated with the digital version of the document; b) tagging one or more of the lines of textual elements with one of a plurality of content tags, a tagged line of textual elements including structured elements of information associated with one of a plurality of predefined sdata (structured data) heuristics associated with the plurality of content tags; c) generating a content-layout model (clayout model), the clayout model associating the one or more content tags with respective repetitive layout positions associated with one of the one or more layout structures; d) tagging one or more lines of textual elements which were not tagged in step b) with one of the plurality of content tags based on inferred repetitive locations of the plurality of content tags provided by the clayout model; and e) extracting the tagged lines of textual information as representative of the structured data associated with the digital version of the document.

BRIEF DESCRIPTION OF THE DRAWINGS

FIG. 1 shows a scanned page of a document including a plurality of layout elements where one layout element corresponds to one structured data (sdata) set according to an exemplary embodiment of this disclosure. Notably, some names, telephone numbers, etc. have been blacked out for privacy concerns.

FIG. 2 shows a scanned page of a document including a plurality of layout elements where two layout elements correspond to one sdata set, a line layout element corresponding to an activity and a block layout element corresponding to the remaining fields according to an exemplary embodiment of this disclosure. Notably, some names, telephone numbers, etc. have been blacked out for privacy concerns.

FIG. 3 shows a scanned page of a document including a plurality of layout elements where three layout elements correspond to one sdata set, a first line layout element corresponding to an activity, a second line layout element corresponding to a name and a block layout element corresponding to a location according to an exemplary embodiment of this disclosure. Notably, some names, telephone numbers, etc. have been blacked out for privacy concerns.

FIG. 6 shows a scanned page of a document including a plurality of layout elements where one sdata set includes three fields: activity, name and location, i.e. city and state, according to an exemplary embodiment of this disclosure. Notably, some names, telephone numbers, etc. have been blacked out for privacy concerns.

DETAILED DESCRIPTION

Figure 4:
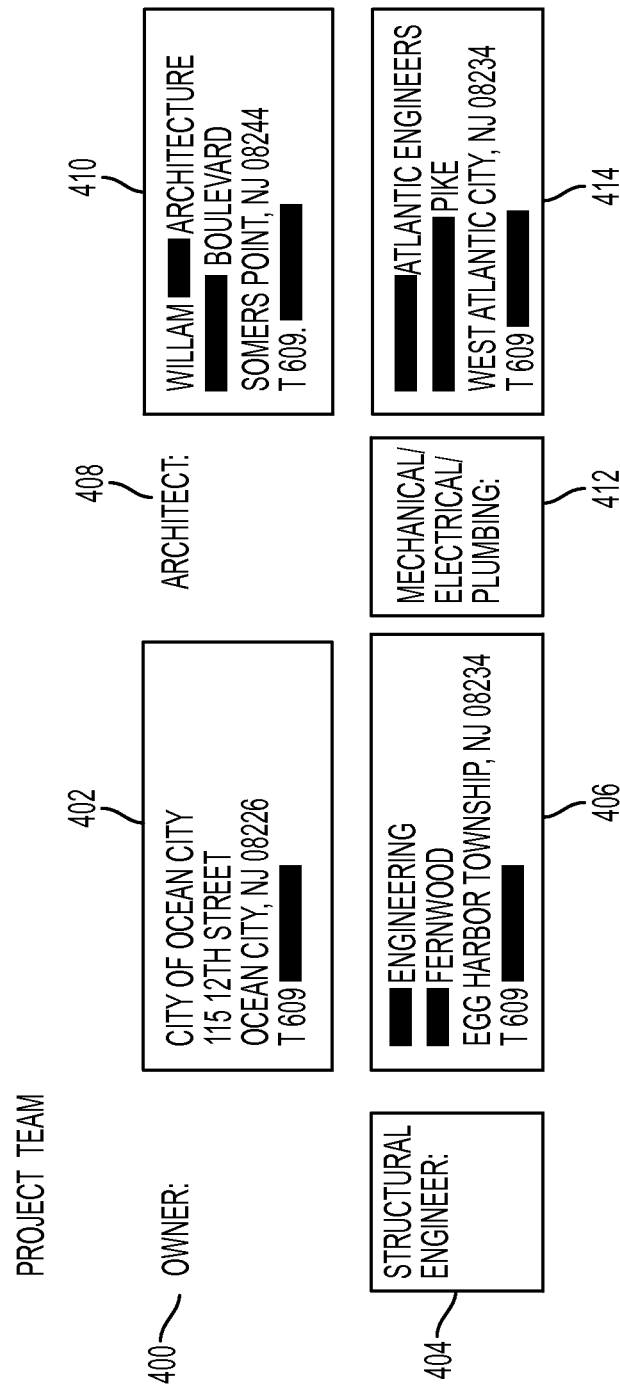
FIG. 4 shows a scanned page of a document including a plurality of layout elements arranged in a 2D (two-dimensional) format, the first and third columns corresponding to activities and the second and fourth columns corresponding to other fields according to an exemplary embodiment of this disclosure. Notably, some names, telephone numbers, etc. have been blacked out for privacy concerns.

Legacy file: A Legacy file corresponds to a document, retained in electronic form that is available in a legacy format. In an embodiment, the legacy format is an unstructured format or partially structured format. Examples of the legacy format include a Tagged Image File Format (TIFF), a Joint Photographic Experts Group (JPG) format, a Portable Document Format (PDF), any format that can be converted to PDF, and the like. In a further embodiment, the legacy format belongs to an image-based format, such as in a scanned file.

Print: A print corresponds to an image on a medium, such as paper, vinyl, and the like, that is capable of being read directly through human eyes, perhaps with magnification. The image can correspond to symbols, text, pictures, images, and/or a combination thereof. According to this disclosure, the image printed on the medium is considered as the print.

Input file: An input file is defined as a collection of data, including image data in any format, retained in an electronic form. Further, an input file can contain one or more pictures, symbols, text, blank or non-printed regions, margins, etc. According to this disclosure, the input file is obtained from symbols, text, pictures, images, and/or a combination thereof that originate on a computer or the like. Examples of the input file can include, but are not limited to, PDF files, an OCR engine processed files, and the like.

Printing: Printing may be defined as a process of making predetermined data available for printing.

Leading distance: A leading distance is defined as a distance between two baselines.

Baseline: A baseline is defined as an invisible line on which one or more token elements are located.

Token element: A token element is defined as a group of characters.

Text element: A text element is defined as a group of token elements.

Vertical overlap: According to this disclosure, when two token elements located on consecutive baselines vertically fall on each other, then they are said to vertically overlap. In an embodiment, two token elements having the same font size are said to vertically overlap with each other.

Baseline grid: A baseline grid is defined as a grid consisting of one or more lines in a block. According to this disclosure, the lines are horizontal in orientation.

Digital-born file: A digital-born file corresponds to a file that originated in a networked world, therefore existing as digital-born since inception.

Disclosed herein is a method and system for extracting structured elements of information, called structured data (sdata), from pages. According to an exemplary embodiment, the method first analyzes the layout of the page to building several layout structures. Then a tagging step is performed in order to tag some elements based on their content. Combining the layout structures and the tagged elements, layout models for representing the structured data are inferred for the current page. These models are used to correct or tag some elements missed by the tagging step. Finally a set of structured data is extracted.

As previously discussed in the background section, a common task in document analysis is to extract data from an unstructured document, sometimes referred to as indexing. The extracted data can correspond to a single piece of text, such as an invoice number, or to structured data, the structured data including several fields, such as an invoice item having a description, price per unit, total amount, etc. Such data is referred to as sdata hereafter.

According to the exemplary method and system disclosed herein, a sdata model is generated, where an sdata is composed of two types of fields: mandatory and optional. An sdata is said to be complete if all mandatory fields are found. Notably, there is no assumption on the relative ordering of the different sdata fields.

The task addressed by the exemplary method and system includes extracting structured data (sdata) and identifying each field of a given sdata. The input object is a page, which can be OCR'd (Optical Character Recognized), or digital-born (PDF). Some content resources are required such as a list of terms, regular expressions, etc., but they do not need to be comprehensive, as will be demonstrated below.

FIGS. 1-6 show some examples where the structured data fields correspond to: name, activity and location (street, telephone, etc.). With reference to FIGS. 1-6, elements without a rectangle are identified as a single line element and elements belonging to homogeneous typographical zones are merged into one rectangular block. Notably, some names, telephone numbers, etc., have been blacked out for privacy concerns.

FIG. 1 shows an example of a scanned page of a document including a plurality of layout elements 102, 104, 106, 108, 110, 112, 114, 116, 118, 120, 122, 124, 126, 128 and 130, where one layout element corresponds to one sdata set.

FIG. 2 shows another example of a scanned page of a document including a plurality of layout elements 202, 204, 206, 208, 210, 212, 214, 216, 218, 220, 222, 224, 226, 228, 230, 232, 234, 236 and 238, where two layout elements correspond to one sdata set, line layout elements 202, 208, 212, 216, 220, 224, 228, 232 and 236 correspond to an activity, and block elements 204, 206, 210, 214, 218, 222, 226, 230, 234 and 238 correspond to the remaining fields.

FIG. 3 shows another example of a scanned page of a document including a plurality of elements 302, 304, 306, 308, 310 and 312, where three layout elements correspond to one sdata set. First line elements 302 and 308 correspond to an activity, second line layout elements 304 and 310 correspond to a name, and block layout elements 306 and 312 correspond to locations.

FIG. 4 shows another example of a scanned page of a document including a plurality of layout elements 400, 402, 404, 406, 408, 410, 412 and 414 arranged in a 2D format. The first column elements 400 and 402, and third column elements 408, 410 correspond to activities. The second column elements 404 and 406, and fourth column elements 412 and 414 correspond to other sdata fields.

Figure 5:
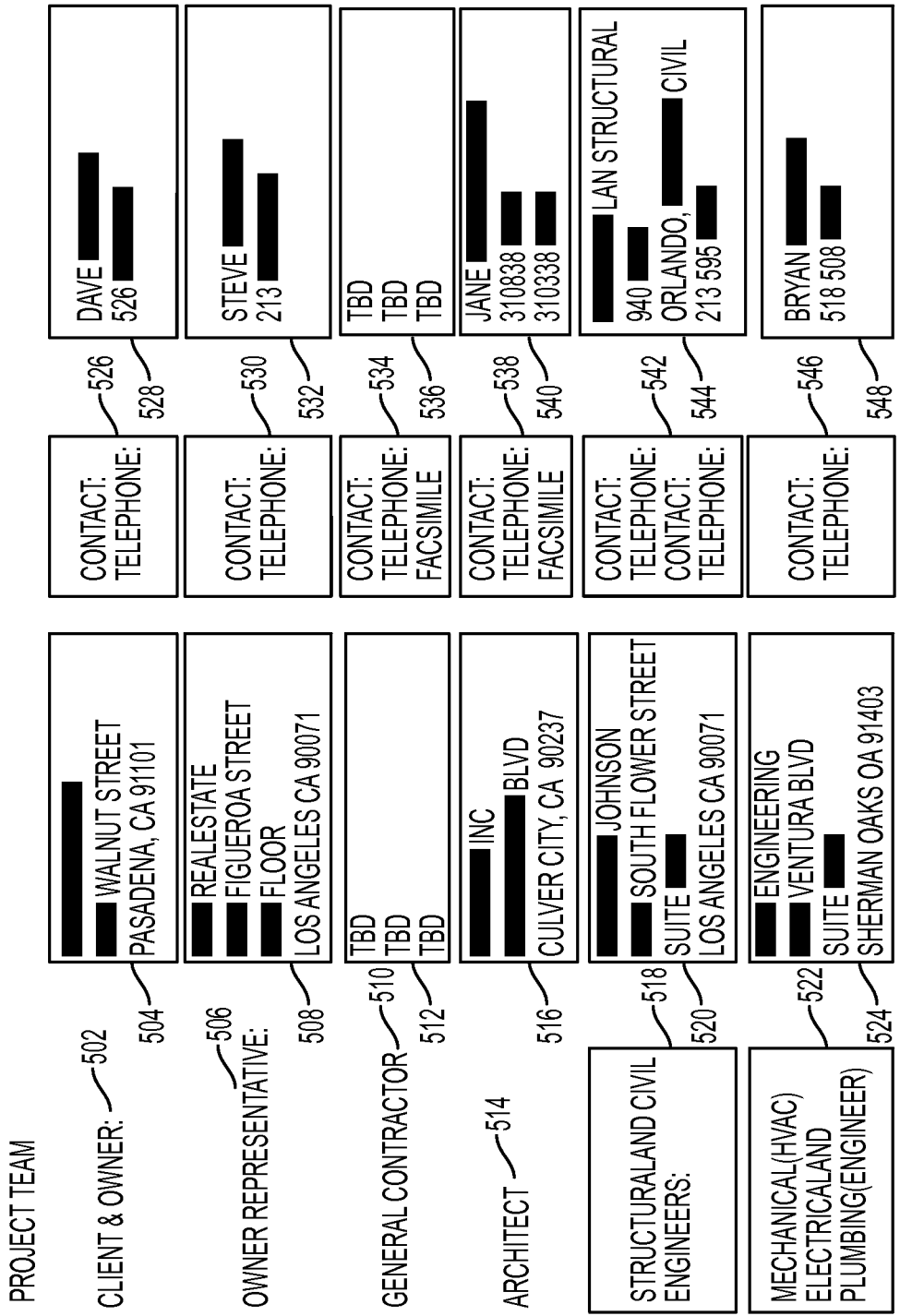
FIG. 5 shows a scanned page of a document including a plurality of layout elements where one sdata set is spread over four cells in a row, according to an exemplary embodiment of this disclosure. Notably, some names, telephone numbers, etc. have been blacked out for privacy concerns.

FIG. 5 shows another example of a scanned page of a document including a plurality of layout elements 502, 504, 506, 508, 510, 512, 514, 516, 518, 520, 522, 524, 526, 528, 530, 532, 534, 536, 538, 540, 542, 544, 546 and 548, where one sdata set is spread over four cells in a row.

FIG. 6 is another example of a scanned page of a document including a plurality of layout elements 602, 604, 606, 608, 610, 612, 614 and 616, where one sdata set includes three field's, activity, name and location.

Figure 7:
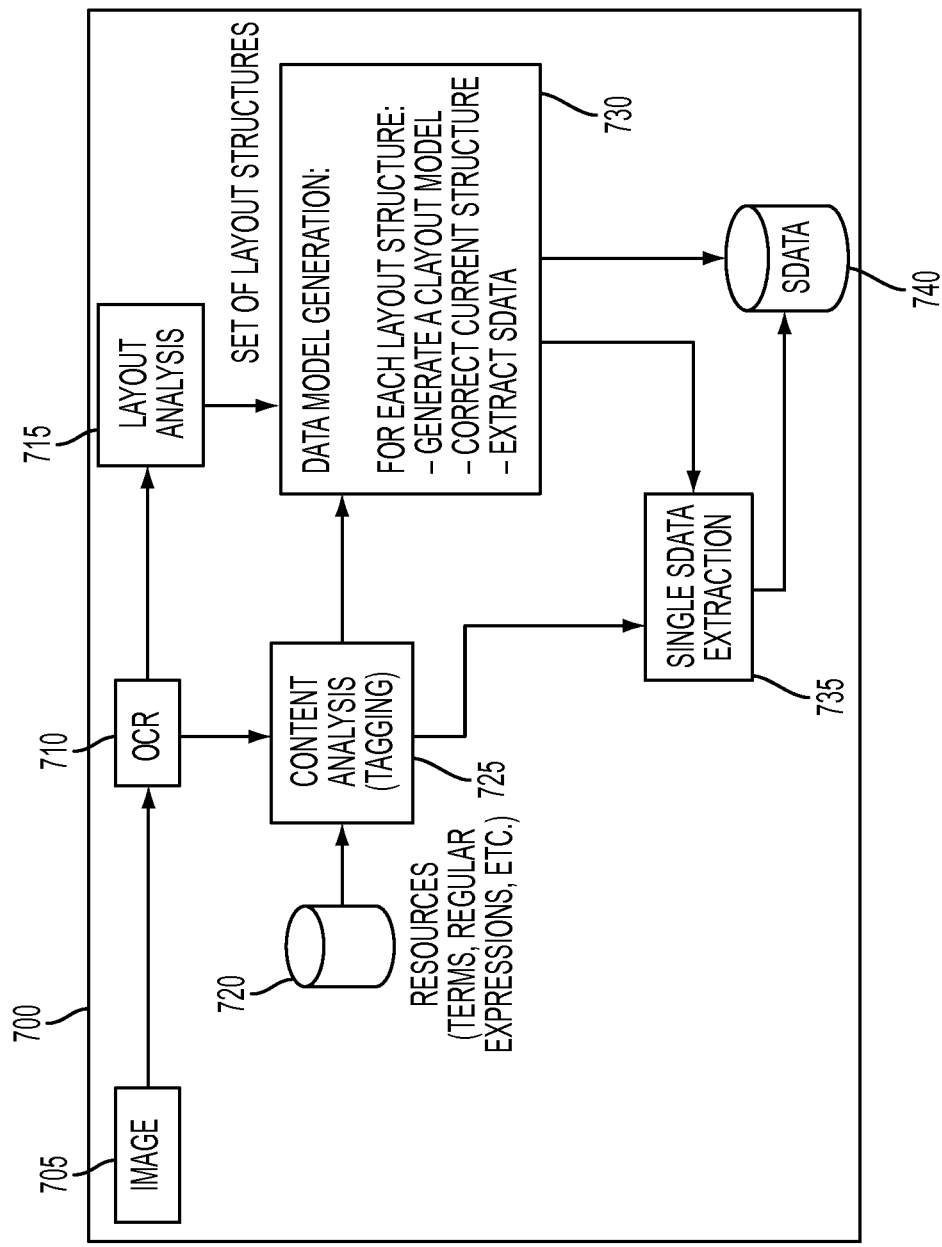
FIG. 7 is a block diagram of a method of extracting sdata associated with a digital version of a document according to an exemplary embodiment of this disclosure.

With reference to FIG. 7, the disclosed exemplary method and system 700 of extracting structured data, i.e., sdata, from a digital version of a document 705 which has been OCRed 710 includes the following:

A. Layout analysis 715 for detecting regular layout structures.

Competing structures can be generated where one element belongs to several layout structures.

B. Content tagging 725 for detecting some data fields based on resource list 720.

C. Data model generation 730. Data model generation infers a model, a so-called clayout model, which combines content information (C-) and layout information (-layout).

D. Using the inferred clayout model 730, completing some elements missed by the tagging step.

E. Data extraction 730: Based on the inferred clayout model, final data is extracted and stored 740. Sdata not covered by the clayout model is extracted using basic heuristics 735.

Figure 8:
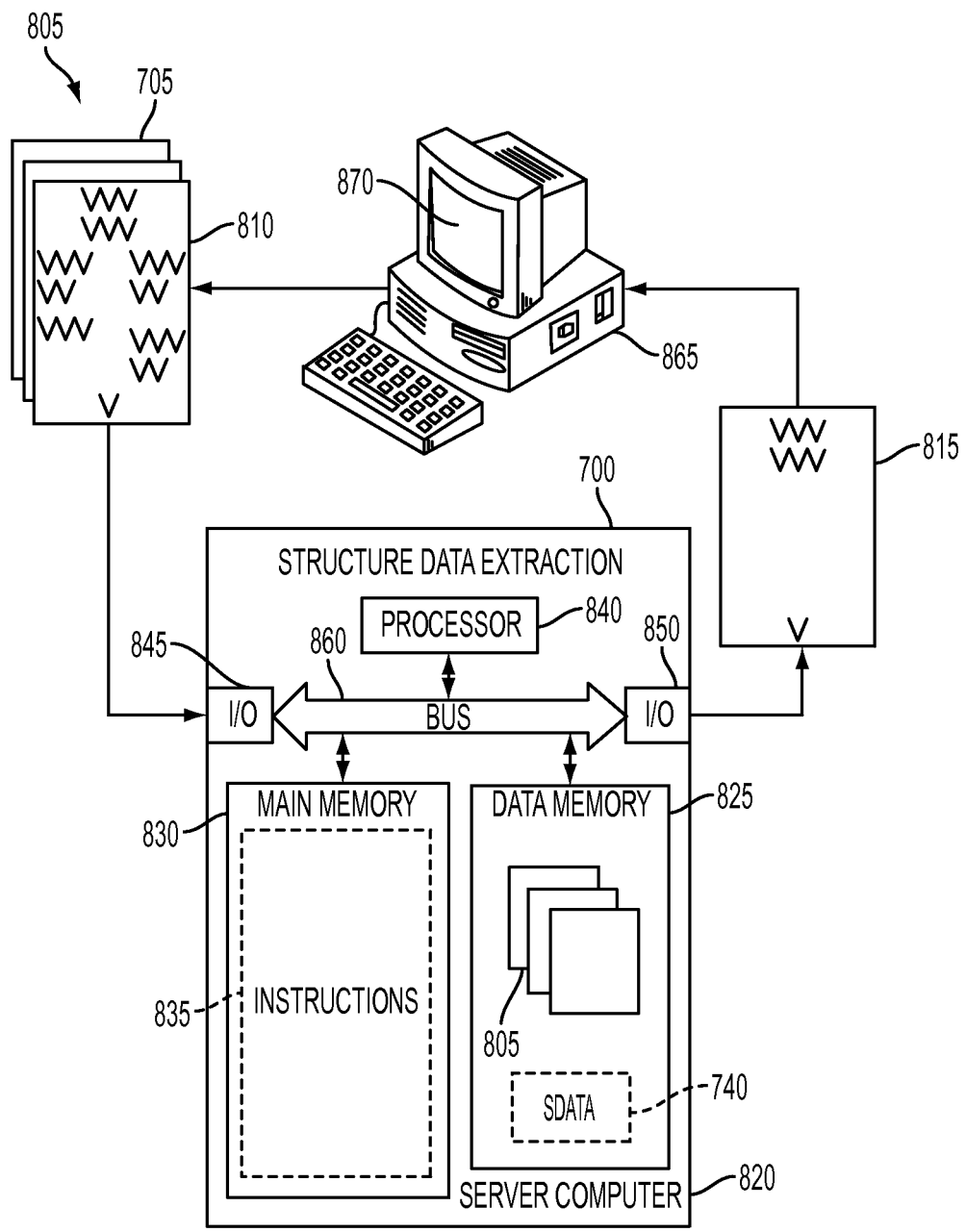
FIG. 8 is a functional block diagram of a document processing system which extracts sdata associated with a digital version of a document according to an exemplary embodiment of this disclosure.

With reference to FIG. 8, illustrated is an exemplary system 805 extracting structured data from a document according to the exemplary methods described herein. The system 805 takes as input an unstructured document 705 which includes one or more document pages 810. The system outputs sdata information 815 describing sdata structure(s) 740 which have been identified on the page and stored in data memory 825, the page including a sequence of elements.

The exemplary system may include one or more specific or general purpose computing devices 820. The system receives, as input, an unstructured document 810 and stores the document in data memory 825 during processing. The document is received in electronic form and can be a technical manual, book, journal publication, report, plan, or the like. The exemplary document is in a page description language, such as a PDF, Portable Document Format (ADOBE SYSTEMS®) file, although other unstructured documents are also contemplated, such as PostScript (ADOBE SYSTEMS®), PCL, Printer Command Language (HEWLETT-PACKARD®), such as PCL-5, PCL-5E, PCL-6, PCL-XL, TIFF, BMP, Word document, or the like. In PDF, for example, each page of a document is assigned a set of elements, such as text elements and graphical elements, and their respective sizes and locations are identified in a job ticket. The exemplary document includes one or more pages, each of which may be processed independently by the system. The page(s) may each include text, images, or combinations thereof. Images can be photographs, graphics, etc.

Main memory 830 of the system 805 stores instructions 835 for performing the exemplary method. These instructions 835 are implemented by an associated processor 840, such as the computer's CPU. The computer communicates with external devices via one or more input/output devices 845, 850. The hardware components 825, 830, 840, 845, 850 are communicatively linked by a data/control bus 860.

While a collection of documents could be processed, rather than a single document, the exemplary method is also suited to processing documents singly. Prior to inputting, the document pages may be stored in any suitable tangible storage media such as a disk, ROM or RAM, or may be input into the system in the form of a carrier wave, e.g., via the Internet. The input device may include a modem link, a wired or wireless connection, USB port, floppy or hard disk receiver, or the like and may be separated or combined with other components of the system. While the illustrated source of the document is a client computing device 865, which may be similarly configured to computer 820, except as noted, it will be appreciated that the document may be input from a scanner, or other digital image capture device, with an associated Optical Character Recognition (OCR) engine for processing the output of the scanner to generate the pages of document, or from a disk, flash drive or other memory storage device.

The system may comprise one or more computing devices such as a personal computer, PDA, laptop computer, server computer, or combination thereof. Memories 825, 830 may be integral or separate and may represent any type of non-transitory computer readable medium such as random access memory (RAM), read only memory (ROM), magnetic disk or tape, optical disk, flash memory, or holographic memory. In one embodiment, the memories comprise a combination of random access memory and read only memory. In some embodiments, the processor and memory may be combined in a single chip.

The digital processor 840 can be variously embodied, such as by a single core processor, a dual core processor (or more generally by a multiple core processor), a digital processor and cooperating math coprocessor, a digital controller, or the like. The digital processor, in addition to controlling the operation of the computer, executes instructions stored in memory for performing the method outlined in FIG. 7, and others discussed herein.

The system may output the information, specifically, document image information, to an external computing device, such as device, or to another output device, such as a display device, such as a screen, or a hardcopy output device, such as a printer, or the like, or to a remote memory storage device. The source/output device may be connected directly with the system or linked thereto, e.g., via a wired or wireless link, such as a local area network or wide area network, such as the Internet. In some embodiments, the information output of the system is stored in memory for further processing, in which content of the document page is labeled or otherwise processed, using the identified structures as input information. The system may generate a graphical user interface (GUI) for display to a user. The exemplary GUI may enable a user to interact with the system via a display screen with a user input device, such as a cursor control device, keyboard, keypad, joystick, touchscreen, or the like. In one exemplary embodiment the display screen 870 is linked to the client computing device 865 and client device includes a web browser which allows the user to interact with the apparatus.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so called "firmware" that is software stored on a ROM or so forth. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The illustrated instructions for performing the method may be in the form of hardware or a combination of hardware and software. As will be appreciated, the system may include fewer or more components while still having the same functionality. For example, components may be combined to form fewer components, or may be functionally separated to form more individual components. These components are best understood with reference to the exemplary described method, which, in part, is described with reference to FIG. 7.

Various aspects of the method and system will now be described in further detail.

Layout Structures Generation 715

The goal of this step is the generation of layout structures for a page. The generated structures can correspond to 2-dimensional structures, such as tabular structures, or 1-dimensional structures, such as vertical or horizontal elements.

First, typographical blocks are generated. See U.S. patent application Ser. No. 13/484,708, filed May 31, 2012, Publication No. 2013/0321867, published Dec. 5, 2013, by Hervé Déjean, entitled "TYPOGRAPHICAL BLOCK GENERATION", hereinafter referred to as "Déjean 1".

Déjean 1 provides a method to extract typographical blocks of texts from an OCR output. Initially, tokens are extracted. Then, close tokens having a common baseline are aggregated into pseudo-lines. Next, the pseudo-lines are linked to their vertical neighbors, a neighborhood including vertically aligned elements. Then, the leading distance between pseudo-lines of a vertical neighborhood are used to group the tokens into blocks. Next, blocks are generated, where a baseline grid is defined for each block using the first baseline and leading value associated with the block, and the pseudo-lines are assigned to the closer line within their respective block grid.

Then, 2-Dimensional structures are identified. See U.S. patent application Ser. No. 13/530,141, filed Jun. 22, 2012, by Hervé Déjean, entitled "SYSTEM AND METHOD FOR IDENTIFYING REGULAR GEOMETRIC STRUCTURES IN DOCUMENT PAGES", hereinafter referred to as "Déjean 2". Déjean 2 provides a method to structure elements which have a tabular structure. The output of this step corresponds to a table structured of rows and cells.

Finally, sequences of vertical and horizontal elements are collected. See U.S. patent application Ser. No. 13/911,452, filed Jun. 6, 2013, by Herve Déjean; entitled "METHODS AND SYSTEMS FOR GENERATION OF DOCUMENT STRUCTURES BASED ON SEQUENTIAL CONSTRAINTS", hereinafter referred to as "Déjean 3". During the collection of vertical and horizontal elements, not all 1D sequences are extracted, only regular sequences of vertical and horizontal elements regularly aligned or indented.

The method of Déjean 3 extracts regular geometric structures in a document page, where a regular geometric structure is defined as a set of elements whose positions are constrained by their respective geometrical relationships. Initially, a 2D regular structure is generated where each element of the 2D structure is related to other elements of the 2D structure according to a regular column and row structure. Then, a uni-directional extension of rows and columns is performed to extend the structure vertically and/or horizontally. The resulting 2D structure corresponds to a tabular structure of rows and columns.

The method of Déjean 3 structures a sequentially ordered set of elements, each being characterized by a set of features. The method computes N-grams from a set of elements for n-contiguous elements, and n-grams are selected which are repetitive. Then, elements matching the most frequent repetitive n-gram are grouped together under a common node and a new sequence is created. This method is iteratively applied to the new sequence resulting in an output including an ordered set of trees.

Figure 9:
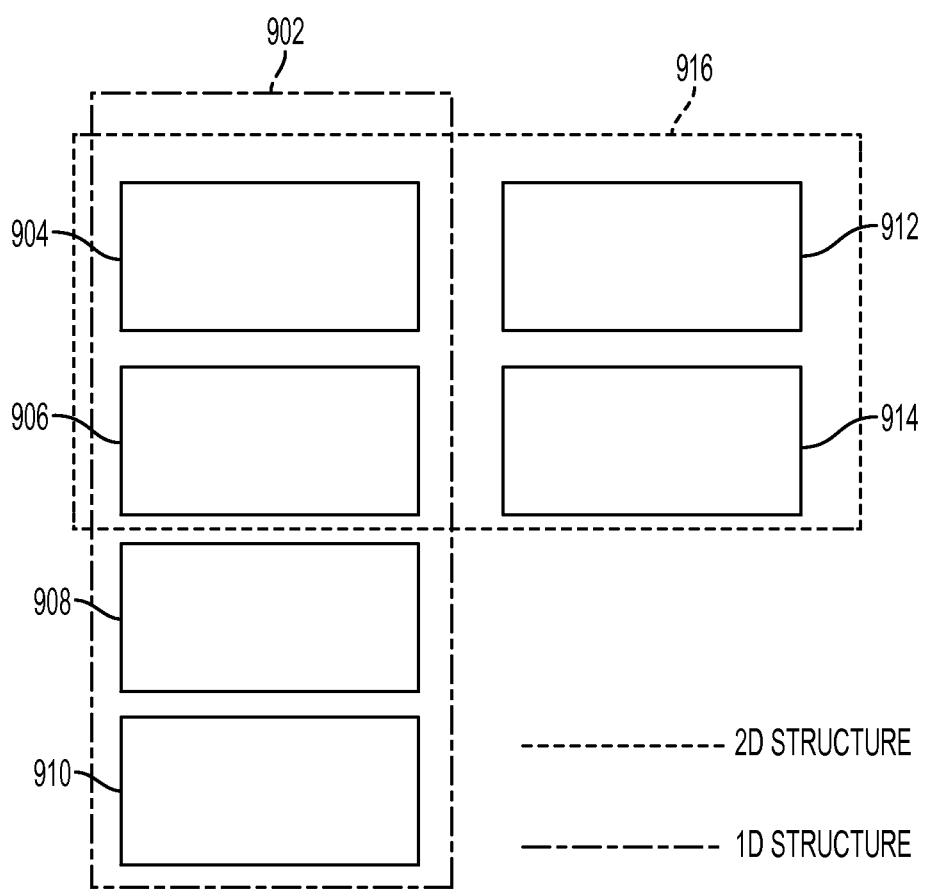
FIG. 9 shows a configuration of a document page including layout elements which belong to a 1D (one-dimensional) structure and a 2D structure, according to an exemplary embodiment of this disclosure.

At this stage of the layout generation step, an element may or may not belong to several structures. FIG. 9 shows an example of a 1D and a 2D layout structure 902 and 916, respectively, where some elements 904, 906, 912 and 914 belong to both structures. Block elements 908 and 910 belong only to the 1D structure 902.

Content Tagging 725

Described now is content tagging. As previously described, an sdata is composed of fields. Field Tagging is performed using basic regular expressions or closed lists in order to tag the most frequent elements of a field, i.e., the most frequent content or pattern. Referring to tagged elements as entities, basic entities covered by regular expressions are: phone number, address, URL, date, etc. The entities described by a list of terms depends on the application.

For the exemplary implementation described herein, the considered content element for tagging corresponds to a line. A part or all of the content of a line may be tagged.

The combination of layout structure and content allows the exemplary method and system to accommodate some non-completeness of the lists. In other words, the most frequent representative elements of a list are adequate. The content tagging completion step, based on the generated layout structure, is performed in Step D. An example list of resources for a specific case is provided in Table 10 below.

Notably, the resources used must be designed where recall is a priority, i.e., precision is less important. The exemplary method and system is able to filter out false positives since the chance of a content element belonging to a structure composed of several sdata is minimal. This allows for the design of very compact content resources based on generic regular expressions.

Data Model Generation: The Clayout Model 730

At this stage, a set of layout structures have been generated, an element being able to belong to several structures. Structures having tagged elements are selected and used in order to generate a data model: the clayout model. The clayout model associates a layout structure, 1D or 2D, and a content structure and describes a specific instance of the sdata for the currently processed document. In other words, the clayout model describes how the sdata is laid out in the document.

Figure 10:
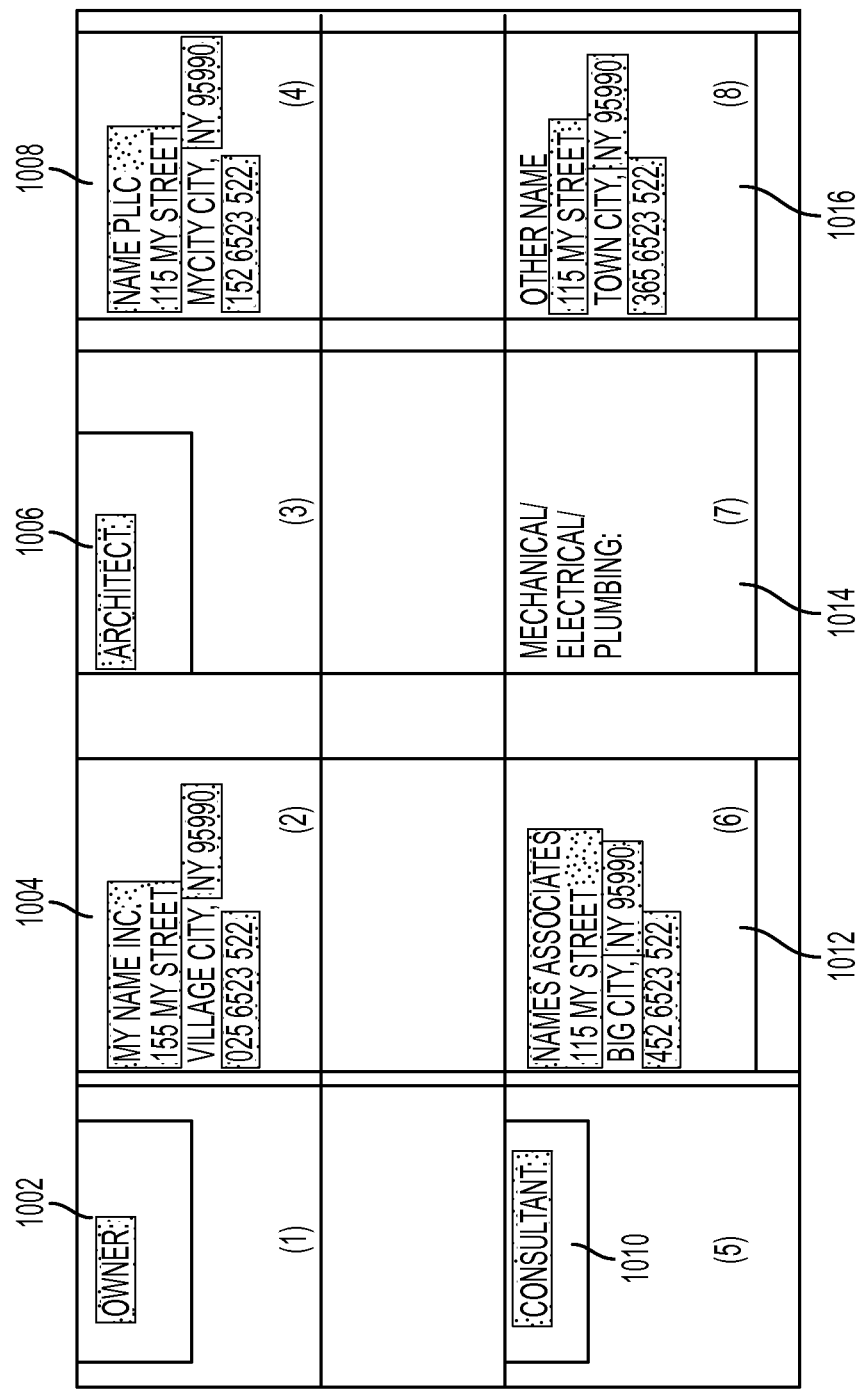
FIG. 10 is an example of a tabular layout structure recognized by a method of extracting sdata according to an exemplary embodiment of this disclosure.

Referring to elements 1002, 1004, 1006, 1008, 1010, 1012, 1014 and 1016 shown in FIG. 10, a tabular layout structure has been identified where tagged elements are highlighted in gray. Cells are numbered 1 to 8.

A sequence-based method is used to generate the clayout model. As an input to the sequence-based method, a sequence of ordered elements is required. Therefore, one 2D-structure is systematically transformed into two 1D-sequences. A first 1D structure includes a set of rows and a second 1D structure includes a set of columns, the elements in two of the sequences being cells. For purposes of generating a clayout model for a 1D structure, a sequence of elements is provided by the 1D-structure itself.

The steps of the sequence-based method are as follows, where the input is an ordered sequence of elements:

1. Elements characterization: Elements are described with a set of features. During this step the fuzzyequality of features is defined, where the term fuzzyequal is used to characterize two features of the same type whose value difference is less than the maximal distance for this feature type.

2. Features are calibrated, where similar features are regrouped together, i.e., a kind of clustering.

3. N-grams generation, where a set of n-grams, from 1 to N, N being a configurable parameter, is generated for the sequence of elements.

4. Repetitive n-grams are selected and ordered by frequency.

5. The most frequent n-gram is selected and sequences of elements matching this n-gram are structured by regrouping under a common node.

6. The identified sequences are enriched with additional n-grams.

7. The method is applied iteratively to the current sequence of elements.

The output of the sequence-based method is a hierarchical representation of the structures.

Summarily, the sequence-based method is a manner of adding tree-like structures on top of a sequence of elements, the tree structures being inferred using repetitive characteristics of the elements. In other words, the elements in one structure share a common feature.

For the exemplary example, two sequences are obtained, hereafter referred to as seq1 and seq2: seq1=[1;2;3;4;5;6;7;8] and seq2=[1;5;2;6;3;7;4;8], where numbers 1-8 refer to cell numbers as shown in FIG. 10.

Each step of the sequence-based method is then applied to the set of layout structures, where an element of the initial sequence corresponds to a cell:

Elements characterization. For each tag associated with an element, a Boolean type feature is generated. Table 1 below provides a list of features associated to each element. As shown in Table 1, several features are possible for one line of a cell, and some elements may have no features, such as element 7.

TABLE 1

| Element (cell) | Features (Boolean; feature value True is skipped) |
|---|---|
| 1 | DISCIPLINE |
| 2 | NAME, STREET, STATE, ZIPCODE, TEL |
| 3 | DISCIPLINE |
| 4 | NAME, STREET, STATE, ZIPCODE, TEL |
| 5 | DISCIPLINE |
| 6 | NAME, STREET, STATE, ZIPCODE, TEL |
| 7 | [ ] |
| 8 | STREET, STATE, ZIPCODE, TEL |

Table 1 illustrates a result associated with the tagging step where the content is relatively regular and therefore easily tagged, such as phone and street. Less regular content may be missed during this tagging step. For example, cell 7 is not recognized where the disciplines occur with a "/" separator. Another example is cell 8 where the name is missed because a specific affix is not included.

Feature calibration. No calibration is performed because the features are Boolean type.

N-grams generation. The maximal size of the n-grams is required to be greater than the maximal number of fields in a structured data.

Table 2, below, is a partial list of n-grams generated for seq1, and Table 3, below, is a partial list of n-grams generated for seq2.

TABLE 2

| N-GRAMS (partial list) | Frequency | repetitive |
|---|---|---|
| DISCIPLINE | 3 | NO |
| STREET | 4 | NO |
| STATE | 4 | NO |
| ZIPCODE | 4 | NO |
| TEL | 4 | NO |
| NAME | 3 | NO |
| DISCIPLINE; STREET | 3 | YES |
| DISCIPLINE; STATE | 3 | YES |
| DISCIPLINE; ZIPCODE | 3 | YES |
| DISCIPLINE; TEL | 3 | YES |
| DISCIPLINE; NAME | | YES |
| DISCIPLINE; STREET; DISCIPLINE | 1 | NO |
| ... | | |
| DISCPLINE; STREET; DISCIPLINE; STREET | 1 | NO |
| ... | | |

TABLE 3

| N-GRAMS (partial list) | Frequency | repetitive |
|---|---|---|
| DISCPLINE | 3 | YES |
| STREET | 4 | YES |
| STATE | 4 | YES |
| ZIPCODE | 4 | YES |
| TEL | 4 | YES |
| NAME | 3 | YES |
| DISCIPLINE; STREET | 1 | NO |
| DISCIPLINE; STATE | 1 | NO |
| DISCIPLINE; ZIPCODE | 1 | NO |
| DISCIPLINE; TEL | 1 | NO |
| DISCIPLINE; DISCIPLINE; STREET | 1 | NO |
| DISCIPLINE; DISCIPLINE; STREET; STREET | 1 | NO |
| DISCIPLINE; NAME | 1 | NO |
| ... | | |

Repetitive n-gram selection. From the previous list, select only repetitive n-grams, i.e., n-grams followed by a similar n-gram.

Then, the most frequent n-gram is selected and sequences of elements matching this n-gram are structured by regrouping under a common node.

Table 2 shows the final structure generated for seq1 and Table 3 shows the final structure generated for seq2. For seq1, the selected n-gram is the bigram (DISCIPLINE; STREET) and the sequence is structured accordingly. For seq2, the most frequent repetitive n-gram selected is STREET, however, other repetitive n-grams with an equal frequency could also have been selected.

No enrichment is required.

Then, after the set of sequences is built, the sequence-based method is applied and structured sequences of tagged elements are generated. For seq1 the structure of sequences of tagged elements is completed after a first iteration. For Seq2, the next iteration provides a selected n-gram (DISCIPLINE), and another iteration provides a selected n-gram (DISCIPLINE+, STREET+).

Applying the sequence-based method as just described generates the structures shown below in Table 4 and Table 5.

Table 4 shows the output structure of the sequence-based method for Seq1 (1; 2; 3; 4; 5; 6; 7; 8). The column of Table 4 labeled "level 3" represents the initial sequence of elements; the column of Table 4 labeled "level 1" represents the atomic repetitive structures associated with (DISCIPLINE; STREET); and the column of Table 4 labeled "toplevel" represents the final sequential structure associated with Seq1.

Table 5 shows the output structure of the sequence-based method for the sequence Seq2 (1; 5; 2; 6; 3; 7; 4; 8). The column of Table 5 labeled "level 4" represents the initial sequence of elements; the column of Table 5 labeled "level 3" represents the atomic repetitive structures associated with DISCIPLINE and STREET; the column of Table 5 labeled "level 2" represents the atomic repetitive structures associated with (DISCIPLINE)+ and (STREET)+; the column of Table 5 labeled "level 1" represents the atomic repetitive structures associated with DISCIPLINE+; STREET+; and the column of Table 5 labeled "toplevel" represents the final sequential structure associated with Seq2. As shown in Table 5, the structure of Seq2 corresponds to a sequence of DISCIPLINE cells and a sequence of STREET cells. Finally, the DISCIPLINE+ and STREET+ structures form a final structure (DISCIPLINE+; STREET+).

Notably, only one feature is selected when generating the sequence, the most regular feature. In the example provided herein, the STREET feature was selected, but the STATE, ZIP, and TEL features could also have been selected which is of no consequence.

TABLE 4

| toplevel | level1 (complete sdata) | level3 |
|---|---|---|
| (DISCIPLINE; STREET)+ | | |
| | (DISCIPLINE; STREET) | |
| | | 1 |
| | | 2 |
| | (DISCIPLINE; STREET) | |
| | | 3 |
| | | 4 |
| | (DISCIPLINE; STREET) | |
| | | 5 |
| | | 6 |
| | | 7 |
| | | 8 |

TABLE 5

| toplevel | level1 | level2 | level3 | level4 |
|---|---|---|---|---|
| (DISCIPLINE+; STREET+)+ | DISCIPLINE+; STREET+ | | | |
| | | (DISCIPLINE)+ | | |
| | | | DISCIPLINE | 1 |
| | DISCIPLINE+; STREET+ | | DISCIPLINE | 5 |
| | | (STREET)+ | | |
| | | | STREET | 2 |
| | DISCIPLINE+; STREET+ | | STREET | 6 |
| | | (DISCIPLINE)+ | | |
| | | | DISCIPLINE | 3 |
| | | | | 7 |
| | | (STREET)+ | | |
| | | | STREET | 4 |
| | | | STREET | 8 |

As shown in Tables 4 and 5, the structured output is based on two elements: a block tagged DISCIPLINE and a block tagged STREET. As shown in FIG. 10, the STREET blocks corresponding to cells 2, 4, 6, can have several tags, and the most regular tag is detected. Notably, working at the cell/block level and not at the line level is convenient to accommodate small variations in the sdata, because the less noisy feature is selected. Furthermore, irregularities at the line level are difficult to accommodate due to OCR errors and optional elements.

A primary focus of the exemplary method and system of extracting sdata is to determine the level the sdata is represented. The output of the sequence-based method is a hierarchical structure, i.e., a tree. Each tree-level, i.e., n-gram columns of Table 2 and Table 3, potentially corresponds to an sdata. To identify the correct level, a notion of completeness is required. In other words, identifying levels corresponding to one single complete sdata, i.e., an sdata including all mandatory fields. Identifying the correct level according to this process yields two possible structures: an appropriate structure or a nonappropriate structure.

Appropriate structure: Starting from the leaves of the tree, the proceeds by level until a level is identified that includes all mandatory fields of the sdata. This level is considered the correct sdata level, because the fields are contained in the sub-tree. Elements occurring at this level are considered as complete sdata and extracted.

Nonappropriate structure: If no complete sdata is identified or a level contains several similar mandatory fields, the inferred structure is not considered as a sequence of sdata and no elements is extracted.

For exemplary example, seq1, level 1 is selected as complete because the mandatory fields, DISCIPLINE and NAME, are present at this level. Notably, in addition to considering selected features, all tags in the elements are considered.

For second sequence seq2, no level corresponds to a complete sdata because level 1 corresponds to a sequence of mandatory fields (DISCIPLINE) and a sequence of STREET fields, which is not considered a single sdata. Therefore, no structure is retained.

After an sdata level is identified for the structured sequence, the clayout model is generated. At this stage, the method identifies a layout used to represent an sdata, and the pieces of information present in the sdata. The purpose of the clayout model is to associate a content tag to a specific layout position. For the exemplary example, the layout position is associated with a line position.

The clayout model generated is then composed of a layout structure. The resulting layout corresponds to the sequence covered by the sdata nodes, where all sdata nodes have the same layout per construction of the structured sequence. If the sdata layout corresponds to a partial 2D structure, then each line in a cell is associated to a content entity. In this case, the different sdata previously recognized, processed to collect tags occurring in each line, and retain all tags which are more frequent than a predetermined threshold. Table 6, below, shows the resulting structure with the frequency in brackets, which represents an intermediary model.

TABLE 6

| DISCIPLINE[4] | NAME[3] |
| | STREET[4] |
| | STATE [4], ZIPCODE[4] |
| | TEL[4] |

For the exemplary example provided herein, a predetermined threshold frequency of two is selected and all elements are retained because all frequencies are above two. The final clayout mode is shown below in Table 7, where a line can include several tags as shown in cell 2; line 3.

TABLE 7

| DISCIPLINE | NAME |
| | STREET |
| | STATE, ZIPCODE |
| | TEL |

For 1D sequences, the clayout model will represent a 1-row table including a list of elements.

Data Correction 730

After the clayout model is generated, i.e., inferred, the clayout model is used to provide one or more missing elements of the structure and/or correct improper tagging of one or more elements. The clayout model is used to process all sdata and missing tags are added to lines which were not tagged.

For the exemplary example, the clayout model provides corrections for two errors. A first error associated with cell 7 (discipline), and a second error associated with cell 8 (name).

TABLE 8

| DISCIPLINE: | NAME: OTHER NAME |
|---|---|
| Mechanical/ | STREET: 115 My Street |
| Electrical/ | STATE, ZIPCODE: Town City, NY 95990 |
| Plumbing: | TEL: 365 6523 522 |

Notably, only one element of the discipline is tagged for the exemplary example.

Final Extraction 735

At this stage, the exemplary method and system disclosed herein is able to identify sdata present in a layout structure. Because elements may belong to several layout structures, typically a 2D structure and a 1D structure, and/or elements may appear several times in a document, duplicated sdata are merged. To merge sdata, a comparison is performed of mandatory fields and the sdata including the most identified fields is retained.

The sdata extracted by the exemplary method and system are highly reliable because the sdata is determined based on regularity at the layout level and at the content level.

For the case of very noisy OCR data, the exemplary method may have limitations for extracting sdata. However, the exemplary method and system can provide a degraded result. In other words, if many elements of a layout structure are tagged, then the whole structure can be considered as a potential sdata structure and accordingly marked-up. This scenario is useful if manual validation is performed.

The final sdata to be extracted are sdata not belonging to any layout structure, or for which the layout structure was not recognized, for example, documents with only one sdata. For documents with only one sdata, the following single sdata extraction method is performed. Notably, the exemplary method and system of extracting sdata described hereinabove requires at least two sdata present in a document.

Single sdata Extraction

If no clayout model is generated for a layout structure associated with a particular, then incomplete sdata elements are selected and the method attempts to complete the sdata elements using neighbor elements while using the generated layout structure to determine the neighborhood. Focusing on the top, bottom, left, and right of the layout structure, missing fields may be captured.

Evaluation

TABLE 9

| Sdata fields | # guessed | # accuracy |
|---|---|---|
| Discipline | 37 | 73% |
| Name | 76 | 92% |
| STREET | 34 | 82% |
| Zip | 32 | 93% |
| State | 0 | — |
| Phone | 42 | 88% |
| Email | 42 | 90% |
| Contact | 12 | 83% |
| url | 6 | 100% |

List of Resources

TABLE 10

| Field | Resources: regular expression or list |
|---|---|
| Discipline | 48 terms |
| Name | (CO\.|INC\.|LTD\.|PC|LLP|PLLC|LLC|LP|LC|[^A-Z]PS|[^A-Z]PC|P\.C|P\.E|P\.S|L\.L\.P|L\.L\.C|P\.L\.L\.C|L\.C\.|L\.P\.)$" |
| STREET | "(?:.. BOX \d+)|([0-9]+ [ \.\0-9-a-Z]+ (FLOOR [a-zA-Z]+|APARTEMENT|SUITE [0-9]+|SOUTH|WEST|NORTH|EAST|STREET|ST\.|DRIVE|DR|AVENUE|AVE|ROAD|WAY|RD\.|LOOP|COURT|CIRCLE|LANE|BOULEVARD|BLVD))(?:$|[^A-Z])" |
| state | List of state name and state abbreviations (52*2) |
| zipcode | (LISTOFSTATE |[NS]\.[CV]|A[LKSZRAP]|C[AOT]|D[EC]|F[LM]|G[AU]|HI|I[ADLN]|K[SY]|LA|M[ADEHINOPST]|N[CDEHJMVY]|O[HKR]|P[ARW]|RI|S[CD]|T[NX]|UT|V[AI T]|W[AIVY])[,\.]?(\d{5})([\-]\d{4})?" |
| City | Not covered |
| Phone number | "[^0-9]?\(?([2-9]\d{2})\)?(-|.|\s)?([1-9]\d{2})(-|.|\s)?(\d{4})" |
| Email | "\w([\.a-zA-Z]+@[a-zA-Z0-9\-]+\.[a-zA-Z0-9\-]{,3})\w" |
| URL | "([a-zA-Z0-9\-\.]+\.[a-zA-Z]{2,3})[^a-zA-Z]" |

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of extracting structured data associated with a digital version of a document, the method comprising:
   a) performing a layout analysis of the digital version of the document to generate two or more tabular layout structures including rows and columns of cells including structural elements associated with the document, each layout structure and associated cells including a plurality of structural elements vertically and horizontally regularly aligned in columns and rows where each structural element is defined as a typographical box including one or more lines of textual elements associated with the digital version of the document;
   b) tagging one or more of the lines of textual elements with one of a plurality of content tags, a tagged line of textual elements including structured elements of information associated with one of a plurality of predefined sdata (structured data) heuristics associated with the plurality of content tags;
   c) generating a content-layout model (clayout model), the clayout model associating the one or more content tags with respective repetitive layout positions associated with one of the two or more layout structures;
   d) tagging one or more lines of textual elements which were not tagged in step b) with one of the plurality of content tags based on inferred repetitive locations of the plurality of content tags provided by the clayout model; and
   e) extracting and merging the tagged lines of textual information from the two or more layout structures as representative of the structured data associated with the digital version of the document,
   wherein step c) generates the clayout model using a sequence-based method to hierarchically segment a sequence of elements associated with the generated two or more layout structures associated with the document; and
   wherein the sequence-based method includes:
   c1) generating a set of n-grams from the sequence of elements, an n-gram including an ordered sequence of n features provided by a sequence of n named elements;
   c2) electing sequential n-grams from the set of n-grams, the sequential n-grams defined as similar contiguous n-grams;
   c3) selecting the most frequent sequential n-gram from the elected sequential n-grams;
   c4) generating a new sequence of the elements by matching the selected most frequent sequential n-gram against the sequence of elements associated with the document, replacing matched elements of the sequence of elements with a respective node, and associating the matched elements of the sequence of elements as children of the respective node; and c5) iteratively repeating steps c1)-c4) on the new sequence of elements generated in step c4) until all sequential n-grams associated with the sequence of elements are matched against the sequence of elements associated with the document, the respective matched elements of the sequence of elements are replaced with a respective node, and the respective matched elements of the sequence of elements are associated as children of the respective node; and wherein step c4) includes:

matching the selected most frequent sequential n-gram against the sequence of elements to determine all sub-sequences of n contiguous element which are matched by the selected n-gram;

enriching the determined sub-sequences, wherein enriching is defined as generating n-grams for each determined sub-sequence; and generating the new sequence of elements by replacing each sub-sequence of contiguous matched elements with the respective node and associating the matched elements of the sequence of elements as the children of the respective node.

2. The computer implemented method of extracting structured data according to claim 1, wherein the structural elements are associated with one or more of a line of text, and a block of text, the text including one or more of letters, numbers and symbols.

3. The computer implemented method of extracting structured data according to claim 1, wherein the two or more layout structures are associated with one or more of a 1D (Dimensional) structure and a 2D structure.

4. The computer implemented method of extracting structured data according to claim 1, wherein the sdata includes one or more fields and step b) and step d) tags the fields based on one or more of a regular expression and a closed list to tag the most frequent elements of a field.

5. The computer implemented method of extracting structured data according to claim 4, wherein the sdata includes one or more mandatory fields and one or more optional fields.

6. The computer implemented method of extracting structured data according to claim 4, wherein basic entities covered by regular expressions include one or more of a phone number, address, URL (Uniform Resource Locator) and date.

7. The computer implemented method of extracting structured data according to claim 1, wherein steps a)-e) are independently performed on a plurality of pages associated with the digital version of the document.

8. An image processing system comprising:

a controller configured to receive a digital version of a document, the controller configured to execute instructions to perform a method of extracting structured data associated with a digital version of a document, the method comprising:

a) performing a layout analysis of the digital version of the document to generate two or more tabular layout structures including rows and columns of cells including structural elements associated with the document, each layout structure and associated cells including a plurality of structural elements vertically and horizontally regularly aligned in columns and rows where each structural element is defined as a typographical box including one or more lines of textual elements associated with the digital version of the document;

b) tagging one or more of the lines of textual elements with one of a plurality of content tags, a tagged line of textual elements including structured elements of information associated with one of a plurality of predefined sdata (structured data) heuristics associated with the plurality of content tags;

c) generating a content-layout model (clayout model), the clayout model associating the one or more content tags with respective repetitive layout positions associated with one of the two or more layout structures;

d) tagging one or more lines of textual elements which were not tagged in step b) with one of the plurality of content tags based on inferred repetitive locations of the plurality of content tags provided by the clayout model; and e) extracting and merging the tagged lines of textual information from the two or more layout structures as representative of the structured data associated with the digital version of the document, wherein step c) generates the clayout model using a sequence-based method to hierarchically segment a sequence of elements associated with the generated two or more layout structures associated with the document; and wherein the sequence-based method includes:

c1) generating a set of n-grams from the sequence of elements, an n-gram including an ordered sequence of n features provided by a sequence of n named elements;

c2) electing sequential n-grams from the set of n-grams, the sequential n-grams defined as similar contiguous n-grams;

c3) selecting the most frequent sequential n-gram from the elected sequential n-grams;

c4) generating a new sequence of the elements by matching the selected most frequent sequential n-gram against the sequence of elements associated with the document, replacing matched elements of the sequence of elements with a respective node, and associating the matched elements of the sequence of elements as children of the respective node; and c5) iteratively repeating steps c1)-c4) on the new sequence of elements generated in step c4) until all sequential n-grams associated with the sequence of elements are matched against the sequence of elements associated with the document, the respective matched elements of the sequence of elements are replaced with a respective node, and the respective matched elements of the sequence of elements are associated as children of the respective node; and wherein step c4) includes:

matching the selected most frequent sequential n-gram against the sequence of elements to determine all sub-sequences of n contiguous element which are matched by the selected n-gram;

enriching the determined sub-sequences, wherein enriching is defined as generating n-grams for each determined sub-sequence; and generating the new sequence of elements by replacing each sub-sequence of contiguous matched elements with the respective node and associating the matched elements of the sequence of elements as the children of the respective node.

9. The image processing system according to claim 8, wherein the structural elements are associated with one or more of a line of text, and a block of text, the text including one or more of letters, numbers and symbols.

10. The image processing system according to claim 8, wherein the two or more layout structures are associated with one or more of a 1D (Dimensional) structure and a 2D structure.

11. The image processing system according to claim 8, wherein the sdata includes one or more fields and step b) and step d) tags the fields based on one or more of a regular expression and a closed list to tag the most frequent elements of a field.

12. The image processing system according to claim 11, wherein basic entities covered by regular expressions include one or more of a phone number, address, URL (Uniform Resource Locator) and date.

13. The image processing system according to claim 11, wherein the sdata includes one or more mandatory fields and one or more optional fields.

14. The image processing system according to claim 8, wherein steps a)-e) are independently performed on a plurality of pages associated with the digital version of the document.

15. A computer program product comprising a non-transitory recording medium storing instructions, which when executed on a computer cause the computer to perform a method of extracting structured data associated with a digital version of a document comprising:
  a) performing a layout analysis of the digital version of the document to generate two or more tabular layout structures including rows and columns of cells including structural elements associated with the document, each layout structure and associated cells including a plurality of structural elements vertically and horizontally regularly aligned in columns and rows where each structural element is defined as a typographical box including one or more lines of textual elements associated with the digital version of the document;
  b) tagging one or more of the lines of textual elements with one of a plurality of content tags, a tagged line of textual elements including structured elements of information associated with one of a plurality of predefined sdata (structured data) heuristics associated with the plurality of content tags;
  c) generating a content-layout model (clayout model), the clayout model associating the one or more content tags with respective repetitive layout positions associated with two of the one or more layout structures;
  d) tagging one or more lines of textual elements which were not tagged in step b) with one of the plurality of content tags based on inferred repetitive locations of the plurality of content tags provided by the clayout model; and
  e) extracting and merging the tagged lines of textual information from the two or more layout structures as representative of the structured data associated with the digital version of the document,
  wherein step c) generates the clayout model using a sequence-based method to hierarchically segment a sequence of elements associated with the generated two or more layout structures associated with the document; and
  wherein the sequence-based method includes:
  c1) generating a set of n-grams from the sequence of elements, an n-gram including an ordered sequence of n features provided by a sequence of n named elements;
  c2) electing sequential n-grams from the set of n-grams, the sequential n-grams defined as similar contiguous n-grams;
  c3) selecting the most frequent sequential n-gram from the elected sequential n-grams;
  c4) generating a new sequence of the elements by matching the selected most frequent sequential n-gram against the sequence of elements associated with the document, replacing matched elements of the sequence of elements with a respective node, and associating the matched elements of the sequence of elements as children of the respective node; and
  c5) iteratively repeating steps c1)-c4) on the new sequence of elements generated in step c4) until all sequential n-grams associated with the sequence of elements are matched against the sequence of elements associated with the document, the respective matched elements of the sequence of elements are replaced with a respective node, and the respective matched elements of the sequence of elements are associated as children of the respective node; and
  wherein step c4) includes:
  matching the selected most frequent sequential n-gram against the sequence of elements to determine all sub-sequences of n contiguous element which are matched by the selected n-gram;
  enriching the determined sub-sequences, wherein enriching is defined as generating n-grams for each determined sub-sequence; and
  generating the new sequence of elements by replacing each sub-sequence of contiguous matched elements with the respective node and associating the matched elements of the sequence of elements as the children of the respective node.

16. The computer program product according to claim 15, wherein the structural elements are associated with one or more of a line of text, and a block of text, the text including one or more of letters, numbers and symbols.

* * * * *